United States Patent [19]

Gaus et al.

[11] Patent Number: 4,823,645

[45] Date of Patent: Apr. 25, 1989

[54] ARRANGEMENT FOR ADJUSTING THE TORQUE OF AN INTERNAL COMBUSTION ENGINE

[75] Inventors: Hermann Gaus, Stuttgart; Gunter Jürgens, Waiblingen; Albrecht Greiner, Stuttgart, all of Fed. Rep. of Germany

[73] Assignee: Daimler-Benz Aktiengesellschaft, Stuttgart, Fed. Rep. of Germany

[21] Appl. No.: 97,720

[22] Filed: Sep. 17, 1987

[30] Foreign Application Priority Data

Sep. 27, 1986 [DE] Fed. Rep. of Germany ....... 3632965

[51] Int. Cl.$^4$ .............................................. B60K 41/04
[52] U.S. Cl. .......................................... 74/866; 74/872
[58] Field of Search ........................... 74/872, 874, 866

[56] References Cited

U.S. PATENT DOCUMENTS

| | | | |
|---|---|---|---|
| 4,355,550 | 10/1982 | Will et al. | 74/872 |
| 4,403,527 | 9/1983 | Nohl et al. | 74/872 X |
| 4,531,431 | 7/1985 | Dreher et al. | 74/866 |
| 4,611,507 | 9/1986 | Burkel et al. | 74/866 |
| 4,625,590 | 12/1986 | Müller | 74/866 |

FOREIGN PATENT DOCUMENTS 2842389 4/1980 Fed. Rep. of Germany .
2935916 4/1981 Fed. Rep. of Germany .

Primary Examiner—David A. Scherbel
Assistant Examiner—Creighton Smith
Attorney, Agent, or Firm—Barnes & Thornburg

[57] ABSTRACT

An arrangement for adjusting the torque of an internal combustion engine which drives a change-speed gear box and automatic gear changing device in dependence on stored characteristics with specified variation of required torque value as a function of power demand in which at least two different gears are each associated with an individual stored characteristic. Switch-in signals, derived from the gear changing device and which initiate switching of a stored characteristic into an adjustment element which influences the torque, contain information on a gear to be selected. Engine power is at least approximately constant for each engine operating point in engine characteristic field when changing between two associated stored characteristics for the required torque value. An adjustment element is controlled by the switch-in stored characteristic until the gear changing device switches to the gear having a different associated stored characteristic.

9 Claims, 4 Drawing Sheets

ARRANGEMENT FOR ADJUSTING THE TORQUE OF AN INTERNAL COMBUSTION ENGINE

BACKGROUND AND SUMMARY OF THE INVENTION

An arrangement for adjusting torque of an internal combustion engine which drives a change-speed gearbox with an automatic gear changing device whose power is controlled by an accelerator pedal operated by a driver. The power is controlled in dependence on stored characteristics with specified variation of a required torque value as a function of power demand, using switch-in signals which are derived from the gear changing device and which initiate switching of a stored characteristic into an adjustment element influencing the torque for controlling the adjustment element.

In a known arrangement of the above type shown in German Published Unexamined Patent Application No. 2,935,916, information is stored as a function of the current engine condition by a first characteristic field as a measure of the normal ignition point in time and the normal injection quantity necessary in the steady-state gear change condition.

Using a second characteristic field, information is provided as a measure of the particular reduction in the engine torque for each engine condition. An engagement signal supplied by a gearbox control unit initiates the gear change and determines the duration of the engine engagement for each engine condition, this engagement signal being preferably not of the same length for all gear change procedures.

An objective of the present invention is essentially to avoid, as far as possible, the driving instabilities, such as slip at the drive wheels when changing down gears or loss of drive torque when changing up gears, caused by the gear changing jolts which still occur during gear changes in the known arrangement. Those jolts occur because of the more or less abruptly changing torque curve, and hence, an objective of the present invention is to achieve better travelling comfort by avoiding driving instabilities.

This and other objectives are achieved in the present invention by providing an arrangement for adjusting torque of an engine which drives a change-gearbox with automatic gear changing device in dependence on stored characteristics with specified variation of a required torque value as a function of power demand, with at least two different gears each associated with an individual stored characteristic. Switching signals contain information on a gear to be selected. Engine power is at least approximately constant for each engine operating point in an engine characteristic field when changing between two associated stored characteristics for the required torque value. The adjustment element is controlled by the switched-in stored characteristic until the gear changing device switches to a gear having a different associated stored characteristic.

In the arrangement according to the present invention, the engine torque is fundamentally adjusted by gear-dependent characteristics which are graduated relative to one another so that the engine operating point moves along a line of approximately constant engine power in the engine characteristic field when changing to a different gear so that gear changing jolts and driving instabilities caused by the jolts no longer occur.

In certain advantageous embodiments of the present invention, each gear has its own characteristic for the required torque value allocated to it. Alternatively, one common characteristic is allocated to a plurality of gears.

For fixing the most favorable time for switching to the new characteristic for the required torque value during each gear change, in certain preferred embodiments, the arrangement comprises means for forming a switch-in signal dependent on a gear transmission ratio containing information on an actual value of the transmission ratio. Such an embodiment also includes means for associating the transmission ratio-dependent switch-in signal with a gear-dependent switch-in signal such that the characteristic for the required torque value is switched into the adjustment element approximately at a specified lead time before attainment of a required value of the gear transmission ratio associated with the gear to be selected.

When changing down, the time for switching in the new characteristic, associated with the lower gear, for the required torque value is fixed sufficiently late relative to the attainment of the new transmission ratio so that the gear change takes place rapidly with the higher power in the upper gear. At the same time, the transmission overshoot which is normally excited during changing down gears is damped or prevented. When changing up gears, on the other hand, it is advantageous to select a time lead for the switching points for changing over to the new required torque value characteristic associated with the higher gear. This is done so that by means of the increase in torque obtained by switching over the characteristics, a jolt-free transition during the transmission ratio-dependent change in torque is achieved.

The above aspects are taken into account in certain preferred embodiments of the present invention which include means for forming the time lead from a correction value associated with the required value of the gear transmission ratio. Further embodiments include variable delay means which receive the gear-dependent switch-in signal and are triggered by the transmission ratio-dependent switch-in signal. In certain embodiments, different correction values are used for changing up gears and changing down gears.

In certain preferred embodiments of the present invention, it has been found advantageous to the driving behavior of the vehicle to use characteristics in which the torque increases in the partial load range approximately linearly with the displacement of the accelerator pedal along the changing lines of the change-speed gearbox.

Certain advantageous embodiments include a switchable characteristic memory for storing the characteristics for the required torque value and identification transducer means controlled by the accelerator pedal which supplies a signal to the switchable characteristic memory. Also contemplated are embodiments having comparator means having an input, and gear change recognition means for alternatively connecting the input to a required value memory for the correction values during changing up gears and to a different required value memory for the correction values during changing down gears.

Other objects, advantages and novel features of the present invention will become apparent from the fol-

DETAILED DESCRIPTION OF THE DRAWINGS

Figure 3:
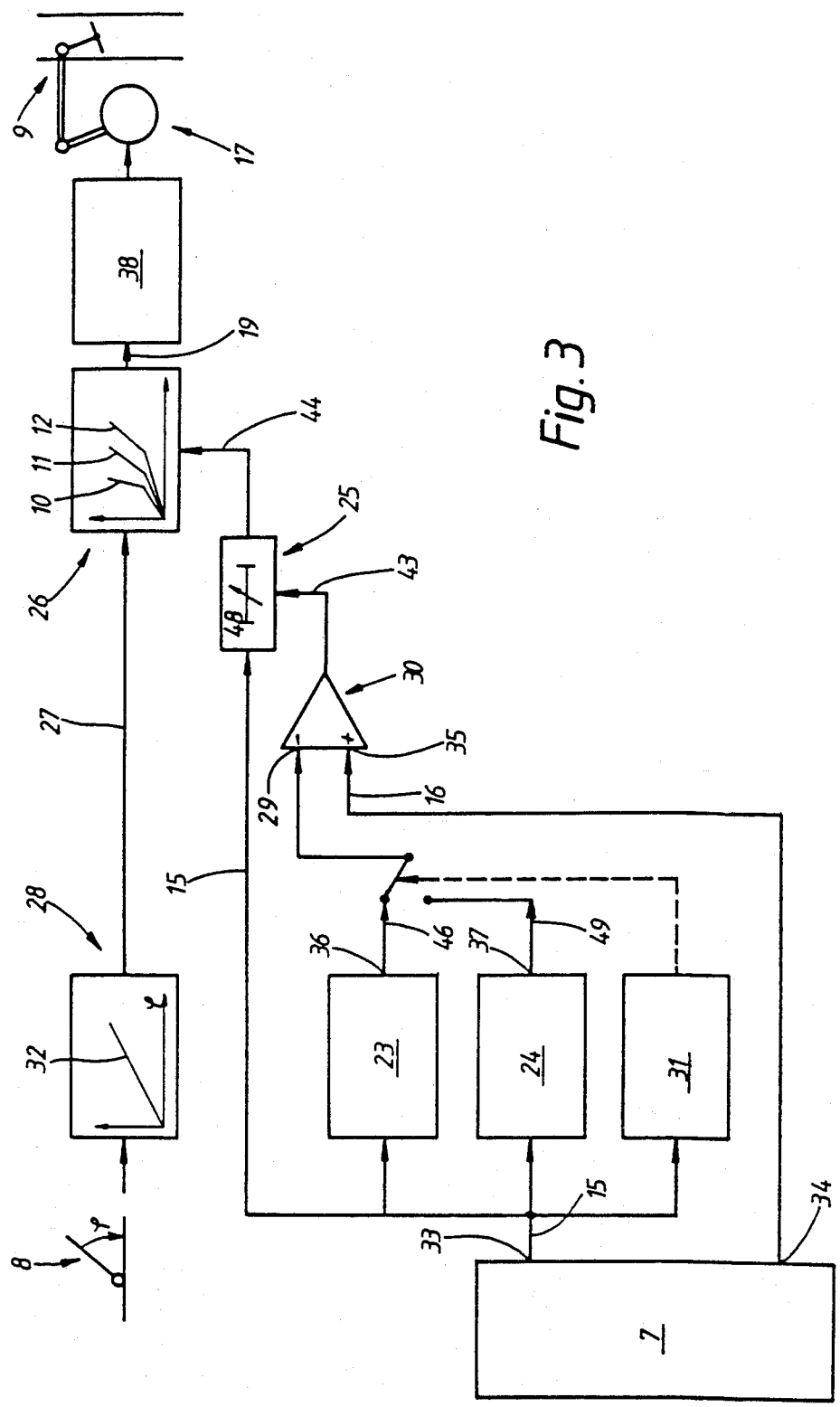
FIG. 3 shows a block circuit diagram of an arrangement according to the invention.

Referring first to FIG. 3, an identification transducer 28 emits a signal 27 for the power demand which, in accordance with a stored characteristic 32, depends on the position of an accelerator pedal 8 operated by the driver. This power demand signal 27 is supplied to a switchable characteristic store 26.

A gear-dependent switch-in signal 15 containing information on the new gear to be selected in the event of a gear change is formed in an electronic control unit 7. Among other things, this electronic control unit 7 is used for the automatic control and changing of a change-speed gearbox driven by an internal combustion engine 9. The switch-in signal 15 is supplied to the inputs of each of two memories 23 and 24, a variable delay element 25 and a change identification stage 31.

For upward gear changing, the output 36 of the memory 23 is connected to an input 29 of a comparator 30, whose second input 35 receives a transmission ratio-dependent switch-in signal 16, which is emitted by the control unit 7 via an output 34. In order to form the switch-in signal 16, the control unit 7 continuously processes the actual values of the gearbox input rotational speed and the gearbox output rotational speed of the change-speed gearbox.

Figure 6:
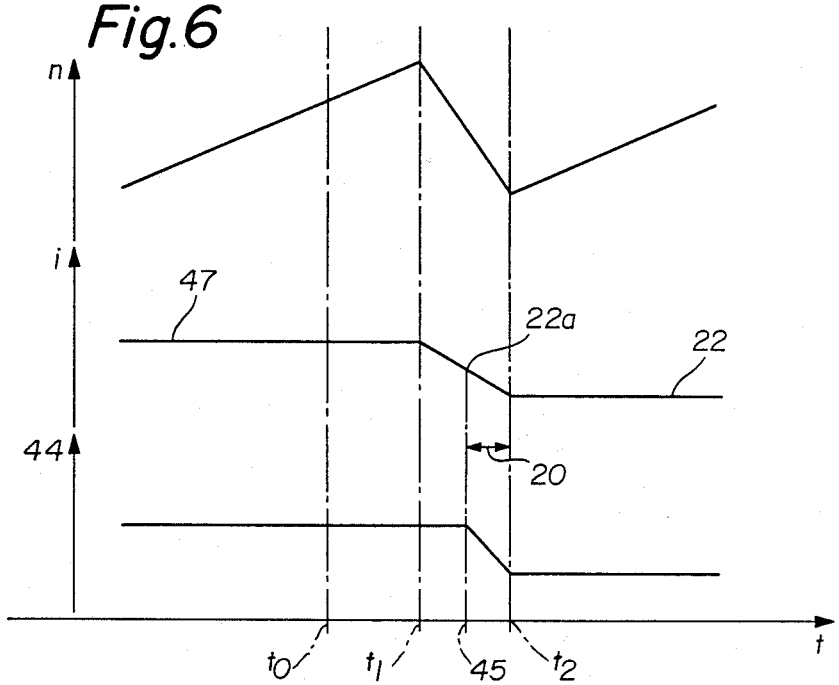
FIG. 6 shows a time diagram corresponding to FIG. 5 for changing up by the arrangement according to the invention.

When changing down, the change identification stage 31 switches over the input 29 of the comparator 30 to the output 37 of the memory 24, whose input is connected to the output 33 of the control unit 7 for the gear-dependent switch-in signal 15. Required values, each associated with a particular gear, for the transmission ratio of the change-speed gearbox are stored in the memory 23. A correction value is allocated to each of these required values, either by multiplication or by the formation of an algebraic sum, in order to form a time lead 20 (FIG. 6). In a corresponding manner, required values, each associated with a particular gear, for the transmission ratio of the change-speed gearbox associated with a particular gear are stored in memory 24. Correction values can be allocated to these required values either by multiplication or by the formation of an algebraic sum in order to allow for both the finite adjustment of time of an electronic controller 38 of an adjustment element 17 and the reaction time of the internal combustion engine 9. These characteristics of the engine unit can, of course, also be taken into account in memory 23 for the correction values for the time lead when changing up gears. The adjustment element 17 operates, for example, on the throttle butterfly of the internal combustion engine 9 in order to adjust the engine torque.

A characteristic 10 for the third gear of the three-speed change-speed gearbox driven by the internal combustion engine 9, a characteristic 11 for the second gear and a characteristic 12 for the first gear are stored in the characteristic memory 26 so that, in each gear, the signal 27 of the power demand is converted into an output signal 19 for the required torque value as a function of a characteristic associated with this gear only, the output signal 19 being supplied to the controller 29.

Figure 1:
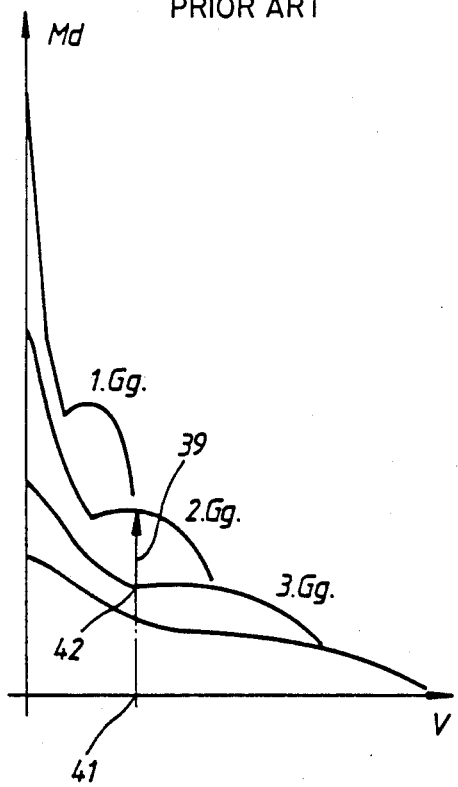
FIG. 1 shows a driving diagram for the variation of the engine torque with travelling speed in the individual gears with a representation of changing down by conventional arrangements.
Figure 2:
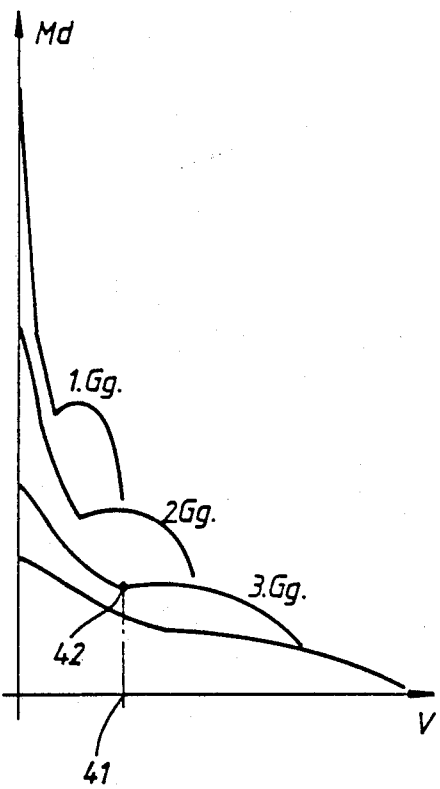
FIG. 2 shows the driving diagram of FIG. 1 with representation of changing down by the arrangement according to the invention.

The advantage of the use, in accordance with the Present invention, of characteristics specific to each gear is made clear by a comparison of FIGS. 1/1a, on the one hand, and FIGS. 2/2a, on the other.

Figure 1A:
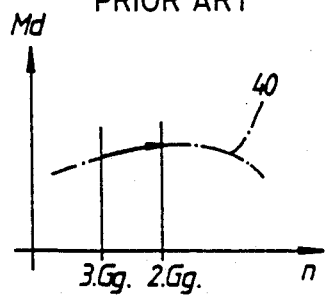
FIG. 1a shows a representation of the changing down operation of FIG. 1 in the engine characteristic field.

FIGS. 1 and 2 each contain a driving diagram in which the travelling speed v is plotted on the abscissa and the engine torque Md is plotted on the ordinate. The associated torque lines for the gears 1 to 3 are plotted in the diagrams. From FIG. 1, there is a substantial torque step 39 when changing down from the third gear to the second gear by conventional arrangements. In accordance with the engine characteristic field of FIG. 1a, in which the engine speed n is plotted on the abscissa and the engine torque Md is plotted on the ordinate, the engine operating point for the conventional arrangement during gear changes runs along a particular line 40 for a constant throttle butterfly position.

Figure 2A:
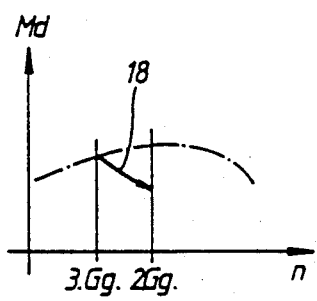
FIG. 2a shows the representation of the changing down operation of FIG. 2 in the engine characteristic field.

In the arrangement according to the present invention, switching over from the steeper characteristic 10 to the flatter characteristic 11 takes place in the characteristic memory 26 when changing down from the third gear to the second gear. Thus, the signal 19 has a small value, resulting, therefore, in a different throttle butterfly position for a smaller engine torque. The characteristics 10 and 11 (and also the characteristics 11 and 12) are so graduated relative to one another that, as shown in FIG. 2a, the engine operating point runs along a particular line 18 of constant engine power, p=constant, during gear changes so that in contrast to FIG. 1, there is no torque step at the switching point 42 of FIG. 2 at the travelling speed 41. The movement of the engine operating point in the engine characteristic field along lines of constant power, in the arrangement according to the invention, also applies, of course, to changing up gears.

Figure 4:
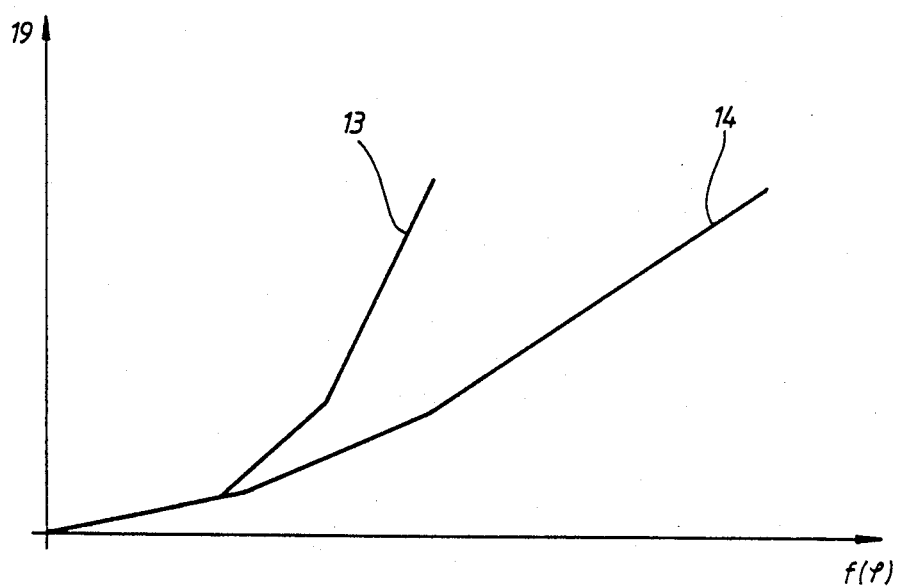
FIG. 4 shows a characteristic diagram.

The characteristics diagram of FIG. 4 refers to a further preferred embodiment of the arrangement in accordance with the invention for a four-gear change-speed gearbox in which the fourth gear is designed as an overdrive so that changes occur frequently between the third gear and the fourth gear. In this embodiment, a characteristic 13 for the fourth gear and only one other characteristic 14, common to the gears 1 to 3, are stored in the characteristic memory 26 so that characteristic switching with p=constant only occurs for the engine operating point between the gears 3 and 4.

The mode of operation and function of the delay element 25 and the comparator 30 are first explained in more detail for changing up gears, using FIG. 6, which shows a diagram in which the time t is plotted on the abscissa and the variation of the engine speed n and the variation of the transmission ratio i of the change-speed gearbox are plotted against the time t. In addition, the diagram shows the activation time 45 for switching over the characteristic in accordance with the present invention, in other words, the appearance of the switching signal 44 at the output of the delay element 25.

During a gear change, when changing either down or up, a change instruction appears initially at the time $t_0$ in the control unit 7. This is used to control servo-valve spools and the like in the hydraulic switching equipment of the change-speed gear and initiates the switch-in signal 15 at the output 33 of the control unit 7, the switch-in signal 15 indicating the gear to be selected. The switch-in signal 15 is therefore supplied to the input of the delay element 25 and also to the input of the required value memory 23 at the time $t_0$. At this time $t_0$, the friction elements which have to take part in changing up, the change control elements, have still not been affected. The change recognition stage 31 has recognized, from the switch-in signal 15, that changing up is concerned and therefore switched the output 36 of the memory 23 to the input 29 of the comparator 30.

From FIG. 6, the higher gear to be selected has a lower transmission ratio 22. In the memory 23, the switch-in signal 15 has cause the output of a corrected required value signal 46 (FIG. 3), which corresponds to a corrected higher transmission ratio 22a (FIG. 6). At the time $t_1$, the change control elements for the gear change are activated so that the higher transmission ratio 47 of the old lower gear is altered over the switching period in the direction of the lower transmission ratio 22.

The change in transmission ratio $\Delta i$ is used in the control unit 7 to form the transmission ratio-dependent switch-in signal 16 by continuous processing of the actual values of the gearbox input and output speeds of the change-speed gearbox. This switch-in signal 16 is supplied to the input 35 of the comparator 30 from the time $t_1$. When the actual value of the changing transmission ratio i is equal to the corrected required value 22a at the time 45, the switch-in signal 43 triggering the delay element 25 appears at the output of the comparator 30. If the delay periods at the input and output of the delay element 25 are each set to zero, the switching signal 44, by which the characteristic corresponding to the higher gear, appears at the output of the delay element 25 at the time 45.

At the time $t_2$, the transmission ratio i has reached the required value 22 of the higher gear, i.e., the gear changing procedure is concluded. This time $t_2$ is taken as the starting point for setting the correction value in the memory 23 for the required value 22a in order to determine the time lead 20 for the activation point 45 at which the characteristics are changed over. By increasing the required value 22a by appropriate correction values in the memory 23, the time lead 20 can be adjusted such that the increase in torque achieved by the change has the effect of a jolt-free variation of the torque in the change of torque which depends on transmission ratio. In the reverse direction, the time lead 20 is reduceable for fixed correction values in the memory 23, by setting a finite delay period 48 at the input of the delay element 25. Thus, the appearance of the switching signal 44, and hence the activation point 45, is displaced in the direction of the conclusion $t_2$ of the gear change.

Figure 5:
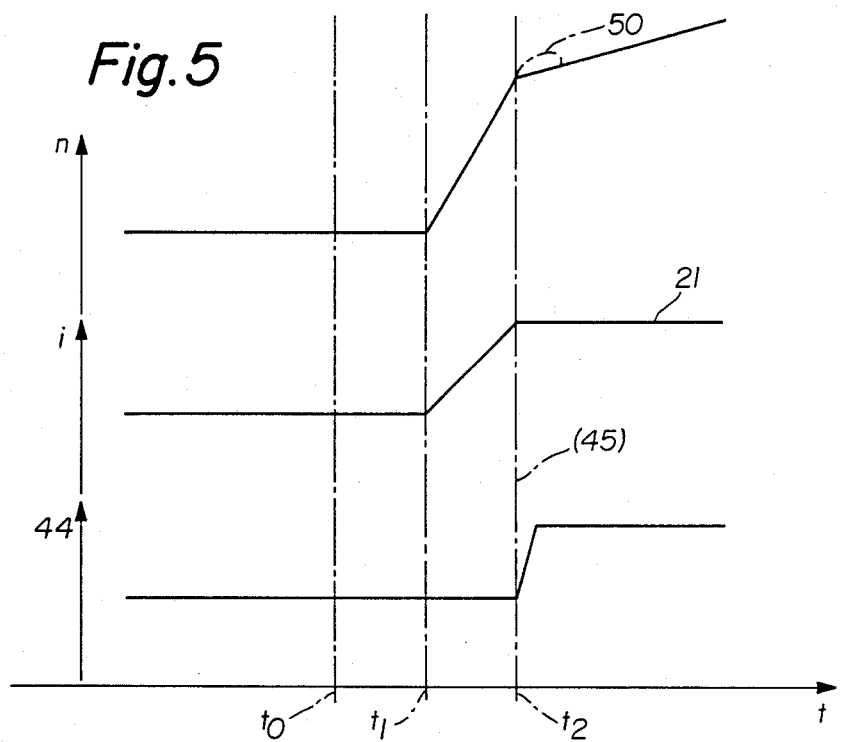
FIG. 5 shows a time diagram for the variation of the engine speed and the gearbox transmission ratio and for the employment of characteristic switching when changing down by the arrangement according to the invention.

It is preferable to proceed in the direction last mentioned during changing down gears, as represented by FIG. 5, which again shows a diagram in which the variation of the gear transmission ratio i and the variation of the engine speed n are plotted against the time t and in which the switching times $t_0$, $t_1$ and $t_2$ are given together with the time at which the switching signal 44 for switching over the characteristics occurs.

When changing down, the gear-dependent switch-in signal 15, which is supplied to the inputs of the delay element 25, the memory 24 and the change recognition stage 31, again appears at the time $t_0$. The change recognition stage 31 has switched input 29 of the comparator 30 to the output 37 of the memory 24, at which appears a required value signal 49 associated with the gear to be selected. This signal 49 is only slightly, if at all, corrected with respect to the required value 21 (FIG. 5) for the transmission ratio of the lower gear, or is corrected in such a way that, matching a finite delay period 48 possibly set at the input of the delay element 25, the activation point 45 for the appearance of the switching signal 44 for switching over the characteristics occurs just before or at the end of the changing operation $t_2$. At this time $t_2$, the transmission reaction element of the lower gear to be selected engages. This was associated with overshoot of the transmission in conventional arrangements (indicated by dotted curve at 50) but is now avoided by the invention. The comparator 30 and the characteristics memory 26 otherwise operate on the controller 38 of the adjustment element 17, in order to adjust the throttle butterfly of the internal combustion engine 9, in a manner corresponding to that described above in connection with changing up gears.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Arrangement for adjusting torque of an internal combustion engine which drives a change-speed gearbox with an automatic gear changing device and whose power is controlled by an accelerator pedal operated by a driver, in dependence on stored characteristics with specified variation of a required torque value as a function of power demand, using switch-in signals which are derived from said gear changing device and which initiate switching of a said stored characteristic into an adjustment element influencing said torque, for controlling said adjustment element, wherein:
   at least two different gears are each associated with an individual said stored characteristic;
   said switch-in signals contain information on a gear to be selected;
   engine power is at least approximately constant for each engine operating point in an engine characteristic field when changing between two said associated stored characteristics for said required torque value; and
   said adjustment element is controlled by said switch-in stored characteristic until said gear changing device switches to said gear having said different associated stored characteristic.

2. Arrangement according to claim 1, wherein a characteristic for said required torque value is associated with each said gear.

3. Arrangement according to claim 1, wherein a common characteristic for said required torque value i associated with a plurality of said gears.

4. Arrangement according to claim 3, comprising means for forming a switch-in signal dependent on a gear transmission ratio and containing information on an actual value of said transmission ratio, and means associating said transmission ratio-dependent switch-in signal being with a gear-dependent switch-in signal such that said characteristic for said required torque value is switched into said adjustment element approximately at a specified lead time before attainment of a required value of said gear transmission ratio associated with said gear to be selected.

5. Arrangement according to claim 4, further comprising means for forming said lead time from a correction value associated with said required value of said gear transmission ratio.

6. Arrangement according to claim 5, further comprising variable delay means which receives said gear-dependent switch-in signal and is triggered by said transmission ratio-dependent switch-in signal.

7. Arrangement according to claim 6, wherein different said correction values are used for changing up gears and changing down gears.

8. Arrangement according to claim 7, further comprising a switchable characteristic memory for storing said characteristics for said required torque value; and identification transducer means controlled by said accelerator pedal which supplies a signal to said switchable characteristic memory.

9. Arrangement according to claim 8, further comprising comparator means having an input gear change recognition means for alternatively connecting said input to a required value memory for said correction values during changing up gears and to a different required value memory for said correction values during changing down gears.

* * * * *